United States Patent
Takahashi et al.

(10) Patent No.: US 9,133,613 B2
(45) Date of Patent: Sep. 15, 2015

(54) HEAT RAY SHIELDING ADHESIVE COMPOSITION, HEAT RAY SHIELDING TRANSPARENT ADHESIVE SHEET, AND METHOD FOR PRODUCING SAME

(75) Inventors: Chihiro Takahashi, Tokyo (JP); Hideomi Sakai, Sanyoonoda (JP); Yukihiro Hara, Tokyo (JP); Michiharu Arifuku, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/345,003

(22) PCT Filed: Sep. 10, 2012

(86) PCT No.: PCT/JP2012/073093
§ 371 (c)(1),
(2), (4) Date: Mar. 14, 2014

(87) PCT Pub. No.: WO2013/039039
PCT Pub. Date: Mar. 21, 2013

(65) Prior Publication Data
US 2014/0361210 A1 Dec. 11, 2014

(30) Foreign Application Priority Data
Sep. 17, 2011 (JP) ................... 2011-203869

(51) Int. Cl.
*E04B 1/76* (2006.01)
*C09J 11/04* (2006.01)
*C09J 133/02* (2006.01)
*C09J 201/00* (2006.01)
(Continued)

(52) U.S. Cl.
CPC ............ *E04B 1/7641* (2013.01); *B32B 17/064* (2013.01); *C09J 7/00* (2013.01);
(Continued)

(58) Field of Classification Search
None
See application file for complete search history.

(56) References Cited

U.S. PATENT DOCUMENTS

2008/0306201 A1* 12/2008 Beltrame et al. ............. 524/432
2009/0116100 A1 5/2009 Ota et al.
(Continued)

FOREIGN PATENT DOCUMENTS

EP 2495217 A1 9/2012
JP 57-10913 A 1/1982
(Continued)

OTHER PUBLICATIONS

JP 2005213482 A, Aug. 2005, English AB.*
(Continued)

*Primary Examiner* — Satya Sastri
(74) *Attorney, Agent, or Firm* — Nields, Lemack & Frame, LLC

(57) ABSTRACT

[Problem] The present invention relates to: a heat ray shielding adhesive which is used in bonding to a windowpane and the like and shields heat rays; a heat ray shielding transparent adhesive sheet; and a method for producing the heat ray shielding adhesive. The present invention provides a heat ray shielding transparent adhesive sheet which has high transmittance in the visible light region, low haze and more excellent transparency.

[Solution] Transparency and heat ray shielding properties can be imparted in a simpler manner by using a heat ray shielding adhesive composition which contains fine heat ray shielding particles that have a half-value width of the first main peak of from 0.01° to 0.80° (inclusive) as determined by X-ray diffraction pattern, and a heat ray shielding transparent adhesive sheet is therefore able to be produced at low cost.

8 Claims, 2 Drawing Sheets

(51) Int. Cl.
- *G02B 5/22* (2006.01)
- *C09J 7/00* (2006.01)
- *C09J 9/00* (2006.01)
- *C09J 133/08* (2006.01)
- *B32B 17/06* (2006.01)
- *C08K 3/22* (2006.01)
- *C08K 7/18* (2006.01)
- *C08K 11/00* (2006.01)

(52) U.S. Cl.
CPC . *C09J 9/00* (2013.01); *C09J 11/04* (2013.01); *C09J 133/02* (2013.01); *C09J 133/08* (2013.01); *C09J 201/00* (2013.01); *G02B 5/22* (2013.01); *C08K 3/22* (2013.01); *C08K 7/18* (2013.01); *C08K 11/00* (2013.01); *C08K 2003/2231* (2013.01); *C08K 2003/2296* (2013.01); *C09J 2205/102* (2013.01); *C09J 2433/00* (2013.01); *Y10T 428/2982* (2015.01)

(56) References Cited

U.S. PATENT DOCUMENTS

| | | | |
|---|---|---|---|
| 2009/0274896 A1* | 11/2009 | Takeshi et al. | 428/328 |
| 2011/0217542 A1* | 9/2011 | Moroishi et al. | 428/323 |
| 2012/0211692 A1 | 8/2012 | Shiraishi et al. | |
| 2012/0251831 A1* | 10/2012 | Okayasu et al. | 428/423.1 |

FOREIGN PATENT DOCUMENTS

| | | | |
|---|---|---|---|
| JP | 7-85762 A | | 3/1995 |
| JP | 7-257922 A | | 10/1995 |
| JP | 8-281860 A | | 10/1996 |
| JP | 10-8010 A | | 1/1998 |
| JP | 2005213482 A | * | 8/2005 |
| JP | 2009-114326 A | | 5/2009 |
| WO | 2011/052689 A1 | | 5/2011 |
| WO | 2011/074619 A1 | | 6/2011 |
| WO | WO 2011074619 A1 | * | 6/2011 |

OTHER PUBLICATIONS

International Search Report/Written Opinion mailed Dec. 4, 2012 in corresponding PCT application No. PCT/JP2012/073093.

International Preliminary Report on Patentability mailed Mar. 27, 2014 in corresponding PCT application No. PCT/JP2012/073093.

* cited by examiner

HEAT RAY SHIELDING ADHESIVE COMPOSITION, HEAT RAY SHIELDING TRANSPARENT ADHESIVE SHEET, AND METHOD FOR PRODUCING SAME

TECHNICAL FIELD

The present invention relates to a low-haze heat-ray-shielding-adhesive composition and heat ray shielding transparent adhesive sheet which are affixed to window glass or the like to shield heat rays and which have excellent transparency, as well as a method for manufacturing same.

BACKGROUND ART

To reduce heat and conserve energy in building windows, vehicle windows, cold storage or refrigeration showcase windows, and the like, there is demand for these windows to be endowed with the property of reflecting or absorbing heat rays (infrared rays), and one method of doing so is to affix transparent heat ray shielding adhesive sheets to the windows.

One method of creating a conventional highly transparent heat ray shielding adhesive sheet is to form a dielectric multilayer thin film, a metal film, or a thin transparent electro-conductive film as a heat ray shielding layer on a transparent sheet using sputtering, vapor deposition, or the like, and to also apply a coating of an adhesive.

Patent Reference 1 proposes a transparent film with a heat ray shielding film, in which a hard coat layer containing antimony-containing tin oxide microparticles or tin-doped indium oxide microparticles are formed on one surface of a transparent film substrate, a laminated-layer structured film containing an adhesive layer and a peeling layer sequentially laminated is formed on the other surface, and the hard coat layer also serves as a heat ray shielding layer. However, a problem with these methods is that two or more different film-forming steps are needed when creating a heat ray shielding adhesive sheet, and the demand for a simpler method for manufacturing a heat ray shielding transparent sheet has led to endowing the adhesive rather than the sheet with the heat ray shielding property.

Patent Reference 2, for example, discloses the idea of adding a substance having an optical selective absorption characteristic to an adhesive to manufacture an adhesive film having an optical selective absorption characteristic at low cost, but discloses nothing whatsoever concerning the specific manufacturing method, the blending of the adhesive, or the like.

Patent Reference 3 discloses a coating agent which uses hydrophobic antimony-containing tin oxide and a binder resin and which is transparent for visible light but which shields heat rays, and Patent Reference 4 discloses an adhesive sheet which contains heat-ray-shielding microparticles in a hard coat layer or an adhesive layer, and which is transparent for visible light but which shields only heat rays.

However, this adhesive sheet has a three-layer structure containing a heat ray shielding layer, an adhesive layer, and a hard coat layer, and a problem with this sheet is that the object of simplifying the manufacturing steps cannot be achieved.

Patent Reference 5 discloses that the endowing of transparency and heat ray shielding is simplified by dispersing heat-ray-shielding microparticles in an adhesive, and also discloses a heat ray shielding adhesive, a manufacturing method thereof, and a heat ray shielding transparent sheet. However, this heat ray shielding transparent sheet has insufficient transparency in the visible light range and haze, and there is demand for further improvement in transparency in the visible light range, haze, and heat ray shielding.

PRIOR ART REFERENCES

Patent References

Patent Reference 1: Japanese Laid-open Patent Application No. 8-281860
Patent Reference 2: Japanese Published. Examined Application No. 57-10913
Patent Reference 3: Japanese Laid-open Patent Application No. 7-257922
Patent Reference 4: Japanese Patent Publication No. 7-85762
Patent Reference 5: Japanese Patent Publication No. 10-8010

SUMMARY OF THE INVENTION

Problems to be Solved by the Invention

The present invention relates to a heat ray shielding adhesive and a heat ray shielding transparent adhesive sheet adhered to a building window, a vehicle window, window glass for a cold storage or refrigeration showcase, or the like, and the invention is intended to greatly improve transparency, haze, and heat ray shielding in the visible light range, which is an object in conventional adhesives and sheets.

Means Used to Solve the Above-Mentioned Problems

As a result of painstaking research into obtaining a heat ray shielding transparent adhesive sheet having greatly improved haze and transparency in the visible light range, the inventors perfected the present invention upon discovering that it is possible to obtain a heat ray shielding transparent adhesive sheet having greatly improved haze and transparency in the visible light range, in which heat-ray-shielding microparticles are dispersed in an adhesive by controlling the primary particle diameter, the specific surface area, and the half-value width of a first main peak obtained by an X-ray diffraction pattern (XRD pattern) of the microparticles.

Specifically, the present invention relates to:
(1) a heat-ray-shielding-adhesive composition comprising heat-ray-shielding microparticles in which the half-value width of a first main peak obtained by an X-ray diffraction pattern is 0.01 to 0.80°;
(2) the heat-ray-shielding-adhesive composition according to (1), characterized in that the diameter of primary particles of the heat-ray-shielding microparticles is 1 to 100 nm and the specific surface area of the primary particles as calculated by BET is 5 to 200 m$^2$/g;
(3) the heat-ray-shielding-adhesive composition according to (1) or (2), characterized in that the heat-ray-shielding microparticles are either tin oxide, indium oxide, or zinc oxide;
(4) a heat-ray-shielding-adhesive composition, the essential components of which are (A) the heat-ray-shielding microparticles according to any of (1) to (3), (B) an acrylic copolymer, and (C) a dispersant;
(5) the heat-ray-shielding-adhesive composition according to (4), characterized in that the acrylic copolymer contains structural units of a monomer containing an acid anhydride or a carboxyl group in an amount of 1 to 5% of all monomer structural units in the polymer;

(6) the heat-ray-shielding-adhesive composition according to (5), characterized in that the weight-average molecular weight of the acrylic copolymer is 100,000 to 1,200,000;

(7) a varnish composition obtained by dissolving and dispersing the heat-ray-shielding-adhesive composition according to any of (1) to (6) in a solvent at a minimum;

(8) a heat ray shielding transparent adhesive sheet obtained by applying the heat-ray-shielding-adhesive composition according to any of (1) to (6) or the varnish composition according to (7);

(9) the heat ray shielding transparent adhesive sheet according to (8), characterized in having a visible light transmittance of 50% or greater, a solar transmittance of 80% or less, and a haze of 8% or less; and

(10) a method for manufacturing a heat-ray-shielding-adhesive composition, comprising a step of mixing a heat ray shielding microparticle liquid dispersion containing heat-ray-shielding microparticles and a dispersant, and an adhesive containing an acrylic copolymer.

Advantages of the Invention

The heat-ray-shielding-adhesive composition of the present invention and a heat ray shielding transparent adhesive sheet consisting of glass coated with the adhesive composition have good absorption in a wide range from near infrared rays to far infrared rays, excellent transparency, and low haziness. The composition and sheet can effectively and greatly improve heat ray shielding performance, and can improve both the effect of reducing winter heating bills and the effect of reducing summertime temperatures.

According to the method for manufacturing a heat-ray-shielding-adhesive composition of the present invention, a heat-ray-shielding microparticles liquid dispersion containing heat-ray-shielding microparticles and a dispersant is mixed into an adhesive that has been polymerized in advance, a highly transparent adhesive having a low haze value can be manufactured in which the heat-ray-shielding microparticles are dispersed well in the adhesive composition, and heat ray shielding can be imparted while maintaining these characteristics. As a result, a heat ray shielding transparent adhesive sheet can be created without making the heat ray shielding layer and the adhesive layer into individual layers, by coating glass with the adhesive composition. Using these steps for manufacturing a heat ray shielding transparent adhesive sheet, the manufacturing steps can be simplified without making an adhesive layer and a heat-blocking layer into individual layers, and a highly heat-shielding heat ray shielding transparent adhesive sheet can be manufactured at low cost.

BEST MODE FOR CARRYING OUT THE INVENTION

Figure 1:
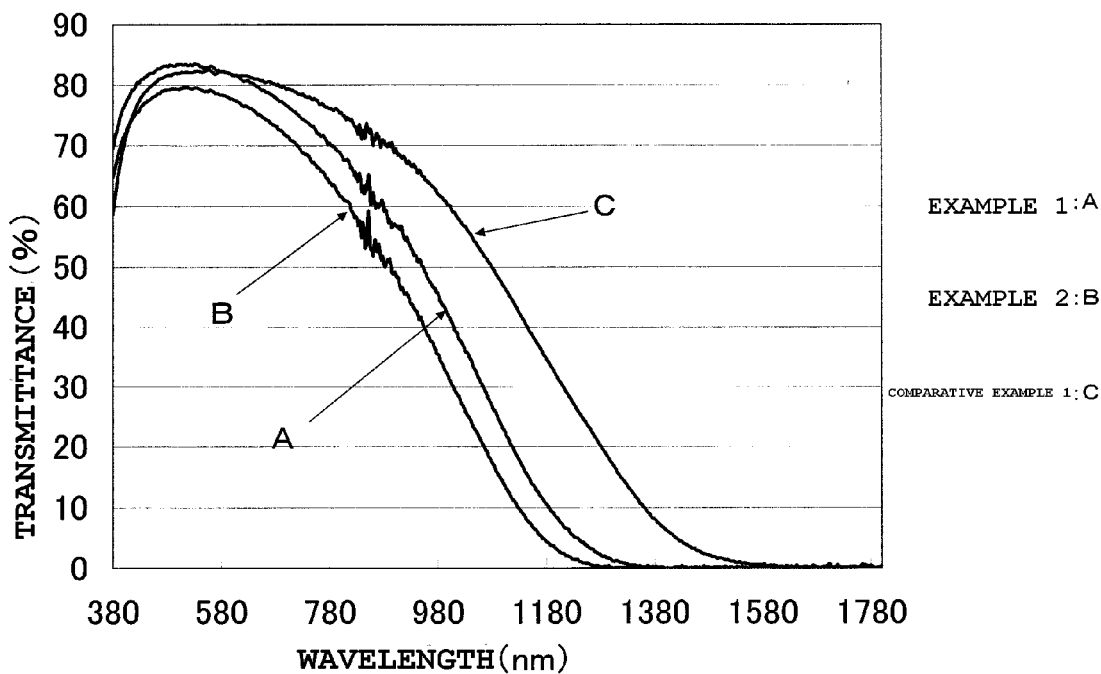
FIG. 1 is a graph showing the spectroscopic transmittance of heat ray shielding adhesive films in working examples of the present invention and a comparative example.

The heat-ray-shielding microparticles used in the heat-ray-shielding-adhesive composition of the present invention are preferably microparticles that do not absorb visible light, and that have the characteristic of satisfactorily absorbing or scattering light between the near infrared range and the far infrared range. An example of such microparticles is an electrically conductive metal oxide having a plasma wavelength in the near infrared range. Specifically, possible examples include tin oxide, indium oxide, zinc oxide, tungsten oxide, chrome oxide, molybdenum oxide. Preferred examples thereof are tin oxide, indium oxide, and zinc oxide, which do not absorb light in the visible range.

It is also highly desirable to dope these oxides with a third component in order to improve their electrical conductivity. As these dopants, Sb, V, Nb, Ta, and the like are selected for tin oxide; Zn, Al, Sn, Sb, Ga, Ge, and the like are selected for indium oxide; and Al, Ga, In, Sn, Sb, Nb, and the like are selected for zinc oxide.

The heat-ray-shielding microparticles used in the present invention are obtained by dispersing primary particles 1 to 100 nm in diameter, obtained as follows, in an organic solvent, with the aid of dispersive energy. The method for manufacturing these microparticles is not particularly limited if it yields 1 to 100 nm microparticles, and the microparticles can be obtained by conventional methods such as gas-phase synthesis and liquid-layer synthesis. The method disclosed in Japanese Laid-open Patent Application No. 6-227815 for indium oxide microparticles, for example. Specifically, this is a method of using an alkali to neutralize an aqueous solution of a salt containing a specific microparticle element, and filtering, washing, and heat-treating the resulting sediment to obtain heat-ray-shielding microparticles. Methods for manufacturing tin oxide microparticles and zinc oxide microparticles are disclosed in Japanese Laid-open Patent Application No. 2-105875 and Japanese Laid-open Patent Application No. 6-234522, respectively. Commercially available microparticles are acceptable as long as they have the performance previously described. The particle diameter is calculated from the specific surface area measured by BET.

A conventional method can be used as the method for dispersing the primary particles in the organic solvent. Specifically, the primary particles and the organic solvent are mixed in a predetermined ratio, a dispersant, surfactant, or the like can be added as necessary, and the primary particles can be dispersed using a dispersion device such as a sand mill, an attritor, a ball mill, a homogenizer, or a roll mill.

The heat-ray-shielding microparticles used in the present, invention have a half-value width of a first main peak obtained by an XRD pattern of 0.01 to 0.8°. When the half-value width is 0.01° or less, it is difficult to ensure transparency because the primary particle diameter increases. When the half-value width exceeds 0.8°, it is difficult to achieve sufficient heat shielding. The preferred lower limit of the half-value width of the heat-ray-shielding microparticles is 0.1°, the preferred upper limit is 0.8°, the more preferred lower limit is 0.2°, and the more preferred upper limit is 0.5°.

Heat-ray-shielding microparticles having a half-value width of 0.01 to 0.8° are obtained by controlling dispersion conditions such as circumferential speed, bead diameter, bead filling rate, and dispersion time when the primary particles are dispersed. The circumferential speed is preferably 1 to 13 m/s and more preferably 2 to 12 m/s. The bead diameter is preferably 1000 to 15 μm, and more preferably 600 to 30 μ/s. The bead filling rate is preferably 10 to 90% and more preferably 20 to 85%. The dispersion time is preferably 1 to 240 minutes and more preferably 5 to 120 minutes.

The primary particles of the heat-ray-shielding microparticles used in the present invention preferably have a specific surface area of 5 to 200 m$^2$/g, more preferably 10 to 150 m$^2$/g, and even more preferably 10 to 100 m²/g, as measured by BET (a specific surface area measurement method) using a BELSORP-minill (BEL Japan, Inc.). Particles having a specific surface area less than 5 m²/g according to BET have a large primary particle diameter, and therefore have a risk of not exhibiting smoothness in the finished surface when used in sheets, films, coatings, or resin compositions. There is also the risk of demerits such as not being able to expect transparency. Particles having a specific surface area greater than 200 m²/g according to BET require a special technique to be manufactured, and have the risk of not having the sufficient degree of crystallization and having compromised heat ray shielding. BET is a method of causing molecules or ions of known size to adsorb to the surface of crushed particles, and measuring the specific surface area of the sample from this quantity.

Because a heat ray shielding transparent adhesive sheet coated with a heat ray shielding adhesive is affixed to window glass and used for the purpose of blocking heat ray components of wavelengths included in sunlight, a first condition is that the sheet have good weather resistance. Therefore, the adhesive resin used in this embodiment is preferably an adhesive resin of an acrylic copolymer having good weather resistance. The acrylic copolymer can normally be created by copolymerizing a main monomer fortified with a polymer that has a low glass transition temperature when homopolymerized, and a comonomer fortified with a polymer having a high glass transition temperature.

The monomer used as the main component of the acrylic copolymer can be an alkyl ester acrylate having a $C_{2-14}$ alkyl group or alkyl ester methacrylate having a $C_{4-16}$ alkyl group and fortified with a polymer that has a lower glass transition temperature when polymerized, and a monomer that can be copolymerized with these alkyl esters and that is fortified with a polymer that has a higher glass transition temperature when polymerized than the other polymer.

Possible examples of the alkyl ester acrylate monomer fortified with a polymer having a low glass transition temperature include ethyl acrylate, n-propyl acrylate, isopropyl acrylate, methoxy ethyl acrylate, n-butyl acrylate, isobutyl acrylate, secondary butyl acrylate, 2-ethyl hexyl acrylate, n-octyl acrylate, isooctyl acrylate, isononyl acrylate, isostearyl acrylate, and the like.

The alkyl ester methacrylate monomer fortified with a polymer having a low glass transition temperature can be 2-ethyl hexyl methacrylate, n-octyl methacrylate, n-lauryl methacrylate, or the like.

The copolymerizable monomer can be vinyl acetate, acrylonitrile, acryl amide, styrene, methyl methacrylate, methyl acrylate, or the like.

To obtain the necessary adhesive performance in the substances other than the monomer, the functional group-containing monomer is (meth)acrylic acid, itaconic acid, hydroxy ethyl (meth)acrylate, hydroxy propyl (meth)acrylate, dimethyl amino ethyl (meth)acrylate, acryl amide, methylol acryl amide, dimethyl acryl amide, glycidyl methacrylate, maleic acid anhydride, or the like.

Typical examples of the dispersant include: low-molecular anionic compounds such as fatty acid salt (soap), α-sulfofatty acid ester salt (MES), alkyl benzene sulfonate (ABS), linear alkyl benzene sulfonate (LAS), alkyl sulfate (AS), alkyl ether sulfate ester (AES), and alkyl sulfate triethanol; low-molecular nonionic compounds such as fatty acid ethanol amide, polyoxyethylene alkyl ether (AE), polyoxyethylene alkyl phenyl ether (APE), sorbitol, and sorbitan; low-molecular cationic compounds such as alkyl trimethyl ammonium salts, dialkyl dimethyl ammonium chloride, and alkyl pyridinium chloride; low-molecular ampholytic compounds such as alkyl carboxyl betaine, sulfobetaine, and lecithin; high-molecular aqueous dispersants typified by a formalin condensate of naphthalene sulfonate, polystyrene sulfonate, polyacrylate, a copolymer salt of a vinyl compound and a carbonate monomer, carboxy methyl cellulose, polyvinyl alcohol, and the like; high-molecular non-aqueous dispersants such as polyacrylate partial alkyl ester and polyalkylene polyamine; and high-molecular cationic dispersants such as polyethylene imine and amino alkyl methacrylate copolymers, but substances having structures other than those exemplified herein are not excluded as long as they can be adequately applied to the particles of the present invention. The following such examples specifically can be used as the dispersant. The examples include: FLOWLEN DOPA-15B, FLOWLEN DOPA-17 (made by Kyoeisha Chemical Co., Ltd.); SOLPLUS AX5, SOLPLUS TX5, SOLSPERSE 9000, SOLSPERSE 12000, SOLSPERSE 17000, SOLSPERSE 20000, SOLSPERSE 21000, SOLSPERSE 24000, SOLSPERSE 26000, SOLSPERSE 27000, SOLSPERSE 28000, SOLSPERSE 32000, SOLSPERSE 35100, SOLSPERSE 54000, SOL SIX 250 (made by the Japan Lubrizol Corporation); EFKA4008, EFKA4009, EFKA4010, EFKA4015, EFKA4046, EFKA4047, EFKA4060, EFKA4080, EFKA7462, EFKA4020, EFKA4050, EFKA4055, EFKA440O, EFKA4401, EFKA4402, EFKA4403, EFKA4300, EFKA4320, EFKA4330, EFKA4340, EFKA6220, EFKA6225, EFKA6700, EFKA6780, EFKA6782, EFKA8503 (made by Efka Additives); AJISPER PA111, AJISPER PB711, AJISPER PB821, AJISPER PB822, AJISPER PN411, FAMIX L-12 (made by Ajinomoto Fine Technologies Co., Ltd.); TEXAPHOR-UV21, TEXAPHOR-UV61 (made by Cognis Japan, Ltd.); Disper BYK101, Disper BYK102, Disper BYK106, Disper BYK108, Disper BYK111, Disper BYK116, Disper BYK130, Disper BYK140, Disper BYK142, Disper BYK145, Disper BYK161, Disper BYK162, Disper BYK163, Disper BYK164, Disper BYK166, Disper BYK167, Disper BYK168, Disper BYK170, Disper BYK171, Disper BYK174, Disper BYK180, Disper BYK182, Disper BYK192, Disper BYK193, Disper BYK2000, Disper BYK2001, Disper BYK2020, Disper BYK2025, Disper BYK2050, Disper BYK2070, Disper BYK2155, Disper BYK2164, BYK220S, BYK300, BYK306, BYK320, BYK322, BYK325, BYK330, BYK340, BYK350, BYK377, BYK378, BYK380N, BYK410, BYK425, BYK430 (made by Byk Chemie Japan K.K.); DISPARLON 1751N, DISPARLON 1831, DISPARLON 1850, DISPARLON 1860, DISPARLON 1934, DISPARLON DA-400N, DISPARLON DA-703-50, DISPARLON DA-725, DISPARLON DA-705, DISPARLON DA-7301, DISPARLON DN-900, DISPARLON NS-5210, DISPARLON NVI-8514L, HIP LARD ED-152, HIP LARD ED-216, HIP-LARD ED-251, HIP LARD ED-360 (made by Kusumoto Chemicals, Ltd.); FTX-207S, FTX-212P, FTX-220P, FTX-220S, FTX-228P, FTX-710LL, FTX-750LL, FUTAGENT 212P, FUTAGENT 200P, FUTAGENT 222F, FUTAGENT 228P, FUTAGENT 245F, FUTAGENT 245P, FUTAGENT 250, FUTAGENT 251, FUTAGENT 710FM, FUTAGENT 730FM, FUTAGENT 730LL, FUTAGENT 730LS, FUTAGENT 750DM, FUTAGENT 750FM (made by Neos Company Ltd.); AS-1100, AS-1800, AS-2000 (made by Toagosei Co., Ltd.); KAOCER 2000, KAOCER 2100, KDH-154, MX-2045L, HOMOGENOL L-18, HOMOGENOL L-95, LEODOL SP-010V, LEODOL SP-030V, LEODOL SP-L10, LEODOL SP-P10 (made by Kao Corporation); EPAN U103, SHALLOL DC902B, NOIGEN EA-167, PLY- SURF A219B, PLYSURF AL (made by Dai-ichi Kogyo Seiyaku Co., Ltd.); MEGAFAC F-477, MEGAFAC 480SF, MEGAFAC F-482 (made by DIC Corporation); SILFACE SAG503A, DYNOL 604, (made by Nishin Chemical Co., Ltd.); SN SPERSE 2180, SN SPERSE 2190, SN LEVELER S-906 (made by San Nopco Limited); and S-386 and S-420 (made by AGC Seimi Chemical Co., Ltd.).

Commonly a lower relative energy difference (RED) of the dispersant with the heat ray shielding particles corresponds to higher solubility, a combination yielding 1.5 or less being preferred. Examples of a dispersant that has an RED with the heat ray shielding particles of 1.5 or less include DISPERBYK-116, DISPERBYK-142, DISPERBYK-145, DISPERBYK-163, DISPERBYK-2000, DISPERBYK-2155, BYK-P105, ANTI-TERRA U, EFKA-4010, and DOPA-17HF, and these can be used more preferably.

The method for calculating the RED is as follows. Using the solubility parameters shown in formula 1, which is proposed in the light of the results of the dispersion forces, dipolar interaction, and hydrogen bonds involved in the Hildebrand solubility parameter ($\delta$), the Hansen parameters $\delta_D$ (involvement by dispersion forces; known as involvement by the London force or the van der Waals force resulting from the formation of dipoles derived from molecular collisions), $\delta_P$ (involvement by polar interaction; meaning involvement by magnetic dipoles produced by the desired molecules when molecules are dissolved in a solution), and $\delta_H$ (involvement by hydrogen bonds; representing specific interaction, e.g. involvement by hydrogen bonds, acid/base bonds, and donor/acceptor bonds) are calculated, and RED is calculated from the ratio of the mutual interaction radius $R_0$ and the distance $R_a$ between Hansen parameters using formulas 2 and 3.

$$\delta^2 = \delta_D^2 + \delta_P^2 + \delta_H^2 \qquad \text{[Formula 1]}$$

$$(R_a)^2 = 4(\delta_{D2}-\delta_{D1})^2 + (\delta_{P2}-\delta_{P1})^2 + (\delta_{H2}-\delta_{H1})^2 \qquad \text{[Formula 2]}$$

$$RED = R_a/R_0 \qquad \text{[Formula 3]}$$

When an adhesive composition containing the heat-ray-shielding microparticles of the present invention is prepared, the method of mixing a microparticle liquid dispersion containing microparticles dispersed in a solvent in an adhesive containing an adhesive resin such as an acrylic copolymer (referred to below simply as "an adhesive") is simple. Therefore, upon researching methods of mixing adhesives and microparticle liquid dispersions, the inventors nave discovered that there will be a difference in the mixability of the microparticles and the liquid dispersion depending on the composition of the acrylic copolymer contained in the adhesive. In the microparticle liquid dispersion composition, a dispersant having an RED between the microparticles and the adhesive of 1.5 or less, a dispersion medium, and a liquid dispersion produced in the presence of acetyl acetate have tendency to resist agglutination, an increase in viscosity, and gelatification in the mixed adhesive composition when mixed with an adhesive; specifically when mixed with an adhesive containing an acrylic copolymer which contains 1 to 5% of carboxyl group- or acid anhydride-containing monomer structure units relative to the total monomer structure units. When this amount is less than 1%, agglutination occurs readily, and when the amount is greater than 5%, viscosity increases or gelatification occurs readily immediately after mixing. The weight average molecular weight of the acrylic copolymer is preferably 100,000 to 1,200,000, and more preferably 200,000 to 800,000.

Specifically, when the objective is to disperse heat-ray-shielding microparticles in a highly viscous adhesive containing an acrylic copolymer of high molecular weight, a large amount of dispersion energy is required, and not only is a lengthy dispersion required with a dispersion device of limited dispersion force, but it is also not possible to achieve at least a certain level of dispersion. When the molecular weight is at least a certain weight, dispersion cannot be achieved because the molecular chains of the resin curl around the heat-ray-shielding microparticles to be dispersed and function as an agglutinant.

When an adhesive having poor dispersion of the heat-ray-shielding microparticles is used, diffusive transmittance is higher than linear transmittance, resulting in an adhesive sheet having a high haze value and poor transparency. Commonly, the scattering of light by the microparticles reaches a maximum at a particle diameter near ½ of the wavelength, and when the particle diameter is less than this, the scattering decreases as the sixth power of the particle diameter. Therefore, when the visible light wavelength is in a range of 400 to 780 nm, scattering is at a maximum when the particle diameter of the heat-ray-shielding microparticles is 200 to 390 nm, scattering decreases with a lesser particle diameter, and when the particle diameter is 100 nm or less, the adhesive film covering is substantially transparent. Therefore, to obtain an adhesive sheet having good transparency, the dispersed particle diameter of heat-ray-shielding microparticles must be 100 nm or less, and when a polymer is used which has high molecular weight and does not yield dispersion, a dispersed particle diameter of 100 nm or less cannot be achieved and the resulting adhesive sheet has poor transparency. Using an adhesive of low molecular weight causes problems in that the film coated with the adhesive has poor physical properties, weak mechanical strength, and poor workability. This adhesive can either be one that is crosslinked or one that is not crosslinked. When it is cross-linked, there are methods of using various cross-linking agents such as epoxy compounds, isocyanate compounds, metal chelate compounds, metal alkoxides, metal salts, amine compounds, hydrazine compounds, and aldehyde compounds; as well as methods of sending radiation; and such methods are appropriately selected according to factors such as the type of functional group.

In the present invention, the degree of crosslinking of the high molecular material constituting the adhesive differs depending on conditions such as the type of adhesive resin and the composition, and the degree of crosslinking is not particularly limited.

The heat-ray-shielding-adhesive composition of the present invention may contain a plasticizer as necessary. Possible examples of this plasticizer include: esters such as ester phthalate, ester trimellitate, ester pyromellitate, ester adipate, ester sebacate, triester phosphate, or glycol ester; process oil, liquid polyester, liquid polyterpene, other liquid resins, and the like; and these examples can be used singly or in mixtures of two or more. Such plasticizers preferably have good compatibility with the adhesive.

In addition to the plasticizer, the heat-ray-shielding-adhesive composition of the present invention can also contain various additives as necessary, such as an ultraviolet absorber, an antioxidant, and a light stabilizer, for example.

In the present invention, the method of coating the heat-ray-shielding-adhesive composition is not particularly limited, but a comma coater, a bar coater, a spin coater, a spray coater, a roll coater, a gravure coater, a knife coater, and other various coating devices can be used.

The dispersed percentage of heat-ray-shielding microparticles to the adhesive resin is determined by the adhesive layer coating thickness and the shielding performance. The optical performance of a film coated with the heat ray shielding adhesive is ideally one of high visible light transmittance and low solar transmittance, but the two commonly have a proportional relationship, and the optical performance is determined depending on which type of performance is to be emphasized.

When a film coated with this heat-ray-shielding-adhesive composition is actually affixed to the window glass of buildings and automobiles and the results of summertime and wintertime are both measured, the solar transmittance is preferably 80% or less in order to achieve a sufficient summertime temperature reduction effect, and the solar transmittance is preferably 50% or greater in order to keep the increase in lighting costs and wintertime heating costs to a minimum. Therefore, the optical characteristics of a film coated with the heat-ray-shielding-adhesive composition are preferably a visible light transmittance of 50% or more and a solar transmittance of 80% or less.

Commonly, a thickness of 10 to 50 μm is normally used as the adhesive layer coating thickness in the light of conformity to the surface to be bonded, adhesion force, and profitability, but the quantity of microparticles given the heat ray shielding attribute in this range is preferably in a range of microparticle to resin solid content of 3:97-1:1 (weight ratio). This is because when the percentage of heat-ray-shielding-microparticles is less than this range, a film thickness of 50 μm or greater is needed to obtain the necessary heat ray shielding attribute, and conversely, when the percentage is greater than this range, the visible light transmittance is too low. Furthermore, the film's haze value must not compromise the transparency of the glass, 8% or less being preferred, and 3% or less being even more preferred.

EXAMPLES

The present invention is described in detail below through Examples, but the present invention is in no way limited by these examples.

Manufacturing Example 1

5.9 g of stannic chloride ($SnCl_4 \cdot 5H_2O$) and 75.9 g of indium chloride ($InCl_3$) were dissolved in 4000 mL of water, to which 2% ammonia water was added over 58 minutes, and hydrates of tin oxide and indium oxide were coprecipitated by ultimately adjusting the pH to 7.85. During this time, the liquid temperature was maintained at 5° C. Next, the coprecipitate was washed, dried, and calcinated for two hours at 900° C., resulting in a fine powder (primary particles) of indium tin oxide (ITO). The resulting fine powder was measured by BET, the results of which were that the specific surface area was 35.3 $m^2/s$, and the particle diameter was 25.6 nm.

Manufacturing Example 2

1.12 g of the ITO fine powder obtained in Manufacturing Example 1, 0.7 g of acetyl acetate, and 0.175 g of the dispersant Disper BYK140 were added to 7 mL of a toluene solution, and the solution was put into a pulverizing container of a batch bead-milling device (T.K. FILMIX 30-25, made by PRIMIX (Corp)). Zirconia beads 30 μm in average particle diameter were used for the crushed beads, and the pulverizing container was filled up to 35% capacity. The motor for crushing was set so that the circumferential velocity was 6.8 m/s, and the crushing time was 10 minutes. The dispersion thus obtained was dried at 120° C. in a dry oven and pulverized with a mortar, after which the XRD pattern (XPERT-PROMPD made by SPECTRIX) was measured, and the half-value width of the first main peak is shown in Table 1.

The resulting dispersion was also subjected to centrifugal treatment at a rotational speed of 5000 rpm for 15 minutes using a centrifugal separator (HIMAC CR18 made by Hitachi Koici Co., Ltd.).

Manufacturing Example 3

1.12 g of the ITO fine powder obtained in Manufacturing Example 1, 0.7 g of acetyl acetate, and 0.175 g of the dispersant Disper BYK140 were added to 7 mL of a toluene solution, and the solution was put into a pulverizing container of a batch bead-milling device (T.K. FILMIX 30-25, made by PRIMIX (Corp)). Zirconia beads 30 μm in average particle diameter were used for the crushed beads, and the pulverizing container was filled up to 70% capacity. The motor for crushing was set so that the circumferential velocity was 10 m/s, and the crushing time was 30 minutes. The dispersion thus obtained was dried at 120° C. in a dry oven and pulverized with a mortar, after which the XRD pattern was measured using an XRD analysis device, and the half-value width of the first main peak is shown in Table 1.

The resulting dispersion was also subjected to centrifugal treatment at a rotational speed of 5000 rpm for 15 minutes using a centrifugal separator (HIMAC CR18 made by Hitachi Koki Co., Ltd.).

Manufacturing Example 4

1.12 g of the ITO fine powder obtained in Manufacturing Example 1, 0.7 g of acetyl acetate, and 0.175 g of the dispersant Disper BYK140 were added to 7 mL of a toluene solution, and the solution was put into a pulverizing container of a batch bead-milling device (T.K. FILMIX 30-25, made by PRIMIX (Corp)). Zirconia beads 30 μm in average particle diameter were used for the crushed beads, and the pulverizing container was filled up to 70% capacity. The motor for crushing was set so that the circumferential velocity was 13.6 m/s, and the crushing time was 60 minutes. The dispersion thus obtained was dried at 120° C. in a dry oven and pulverized with a mortar, after which the XRD pattern was measured, and the half-value width of the first main peak is shown in Table 1. The full width at half maximum (FWHM) (°) in Table 1 shows the half-value width of the first main peak of the XRD pattern of each liquid dispersion.

The resulting dispersion was also subjected to centrifugal treatment at a rotational speed of 5000 rpm for 15 minutes using a centrifugal separator (HIMAC CR18 made by Hitachi Koki Co., Ltd.).

Manufacturing Example 5

50 g/L of an aqueous solution of a zinc oxide slurry was prepared, 3 mol % of a 2 mol/L gallium nitrate aqueous solution was added to the zinc oxide, and the solution was neutralized with sodium carbonate. The result was filtered, washed, dried for ten minutes at 120° C., pulverized with a mortar, and treated for three hours at 400° C. in a reductive atmosphere, resulting in a fine powder (primary particles) of gallium zinc oxide (GZO). The resulting fine powder was measured by BET, the results of which were that the specific surface area was 49.3 $m^2/s$, and the particle diameter was 24.3 nm.

Manufacturing Example 6

1.12 g of the GZO fine powder obtained in Manufacturing Example 5 and 0.175 g of the dispersant ANTI-TERRA U were added to 7 mL of a toluene solution, and the solution was put into a pulverizing container of a batch bead-milling device (T.K. FILMIX 30-25, made by PRIMIX (Corp)). Zirconia beads 30 μm in average particle diameter were used for the crushed beads, and the pulverizing container was filled up to 35% capacity. The motor for crushing was set so that the circumferential velocity was 6.8 m/s, and the crushing time was 10 minutes. The dispersion thus obtained was dried at 120° C. in a dry oven and pulverized with a mortar, after which the XRD pattern (XPERT-PROMPD made by SPECTRIX) was measured, and the half-value width of the first main peak is shown in Table 1.

The resulting dispersion was also subjected to centrifugal treatment at a rotational speed of 5000 rpm for 15 minutes using a centrifugal separator (HIMAC CR18 made by Hitachi Koki Co., Ltd.).

Manufacturing Example 7

1.12 g of the GZO fine powder obtained in Manufacturing Example 5 and 0.175 g of the dispersant ANTI-TERRA U were added to 7 mL of a toluene solution, and the solution was put into a pulverizing container of a batch bead-milling device (T.K. FILMIX 30-25, made by PRIMIX (Corp)). Zirconia beads 30 μm in average particle diameter were used for the crushed beads, and the pulverizing container was filled up to 35% capacity. The motor for crushing was set so that the circumferential velocity was 10 m/s, and the crushing time was 10 minutes. The dispersion thus obtained was dried at 120° C. in a dry oven and pulverized with a mortar, after which the XRD pattern (XPERT-PROMPD made by SPECTRIX) was measured, and the half-value width of the first main peak is shown in Table 1.

The resulting dispersion was also subjected to centrifugal treatment at a rotational speed of 5000 rpm for 15 minutes using a centrifugal separator (HIMAC CR18 made by Hitachi Koki Co., Ltd.).

Manufacturing Example 8

1.12 g of the GZO fine powder obtained in Manufacturing Example 1 (*1), 0.7 g of acetyl acetate, and 0.175 g of the dispersant ANTI-TERRA U were added to 7 mL of a toluene solution, and the solution was put into a pulverizing container of a batch bead-milling device (T.K. FILMIX 30-25, made by PRIMIX (Corp)). Zirconia beads 30 μm in average particle diameter were used for the crushed beads, and the pulverizing container was filled up to 70% capacity. The motor for crushing was set so that the circumferential velocity was 13.6 m/s, and the crushing time was 60 minutes. The dispersion thus obtained was dried at 120° C. in a dry oven and pulverized with a mortar, after which the XRD pattern was measured, and the half-value width of the first main peak is shown in Table 1. The full width at half maximum (FWHM) (°) in Table 1 shows the half-value width of the first main peak of the XRD pattern of each liquid dispersion.

The resulting dispersion was also centrifuged at a rotational speed of 5000 rpm for 15 minutes using a centrifugal separator (HIMAC CR18 made by Hitachi Koki Co., Ltd.).

TABLE 1

Half-value width of first main peak of heat-ray-shielding microparticles

|  | Man. Ex. 2 | Man. Ex. 3 | Man. Ex. 4 | Man. Ex. 6 | Man. Ex. 7 | Man. Ex. 8 |
|---|---|---|---|---|---|---|
| FWHM (°) | 0.441 | 0.487 | 0.904 | 0.405 | 0.511 | 0.878 |

As shown in Table 1, the half-value widths of the liquid dispersions of the first main peaks in Manufacturing Examples 2 to 4 and 6 to 8 were 0.441, 0.487, 0.904, 0.405, 0.511, and 0.878, respectively. This shows that heat shielding microparticles having the desired half-value width were obtained by controlling the circumferential velocity during dispersion.

Manufacturing Example 5

Acrylic Adhesive A 291 g of n-butyl acrylate and 9 g of acrylic acid were dissolved in 366 g of toluene, 0.15 g of azobis isobutyronitrile were added, and the mixture was polymerized for six hours at 70° C. in a nitrogen gas current to obtain an acryl resin copolymer (weight average molecular weight (Mw)=320,000). This was diluted with toluene to obtain an acrylic copolymer solution (acrylic adhesive A) having a solid content of 29.36% and a viscosity of 2700 Pas.

Example 1

Using a comma coater, a separated-sheet polyester film (silicon treated on one side) (3811 made by Rintech, Inc., 38 μm thick) was coated with an adhesive composition containing an evenly dissolved mixture of 100 parts by mass of the acrylic adhesive A (butyl acrylate/acrylic acid=97/3), 128 parts by mass of a toluene liquid dispersion of the indium tin oxide (ITO) prepared in Manufacturing Example 2, and 152 parts by mass of toluene; and the coating was dried and covered with a separated-sheet polyester film (silicon treated on one side) (3801 made by Rintech, Inc., 38 μm thick), thereby forming an adhesive layer (15 μm thick).

Example 2

A toluene liquid dispersion of the indium tin oxide (ITO) prepared in Manufacturing Example 3 was used, otherwise an adhesive sheet was prepared in the same manner as Working Example 1.

Example 3

A toluene liquid dispersion of the gallium zinc oxide (GZO) prepared in Manufacturing Example 6 was used, otherwise an adhesive sheet was prepared in the same manner as Working Example 1.

Example 4

A toluene liquid dispersion of the gallium zinc oxide (GZO) prepared in Manufacturing Example 7 was used, otherwise an adhesive sheet was prepared in the same manner as Example 1.

Comparative Example 1

A toluene liquid dispersion of the indium tin oxide (ITO) prepared in Manufacturing Example 4 was used, otherwise an adhesive sheet was prepared in the same manner as Example 1.

Comparative Example 2

A toluene liquid, dispersion of the gallium zinc oxide (GZO) prepared in Manufacturing Example 8 was used, otherwise an adhesive sheet was prepared in the same manner as Example 1.

For Examples 1 to 4 and Comparative Examples 1 and 2, FIG. 1 and Table 2 show the results of measuring the visible light transmittance, the Tts (solar heat gain), and the haze value when the adhesive sheet is transferred to 3 mm normal plate glass.

(Measuring Tts (Solar Heat Gain))

Using a spectrophotometer (UV-3100 made by Shimadzu Corporation), the Tts of the resulting adhesive sheet was measured in compliance with JIS R3106 (1998).

(Measuring Visible Light Transmittance)

Using a spectrophotometer (UV-3100 made by Shimadzu Corporation), the visible light transmittance of the resulting adhesive sheet at a wavelength of 380 nm to 780 nm was measured in compliance with JIS R3106 (1998).

(Measuring Haze Value)

Using a haze meter (TC-HIIIDPK made by Tokyo Denshoku), the haze value of the resulting adhesive sheet was measured in compliance with JIS K6714.

TABLE 2

Visible light transmittance and solar heat gain

| | Visible light transmittance (%) | Solar heat gain (%) | Haze |
|---|---|---|---|
| Ex. 1 | 82.7 | 67.9 | 0.1 |
| Ex. 2 | 78.4 | 64.2 | 0.1 |
| Comp. Ex. 1 | 82.0 | 70.9 | 2 |
| Ex. 3 | 82.6 | 71 | 0.3 |
| Ex. 4 | 81.7 | 69.5 | 0.4 |
| Comp. Ex. 2 | 64.2 | 72.1 | 2.4 |

Figure 2:
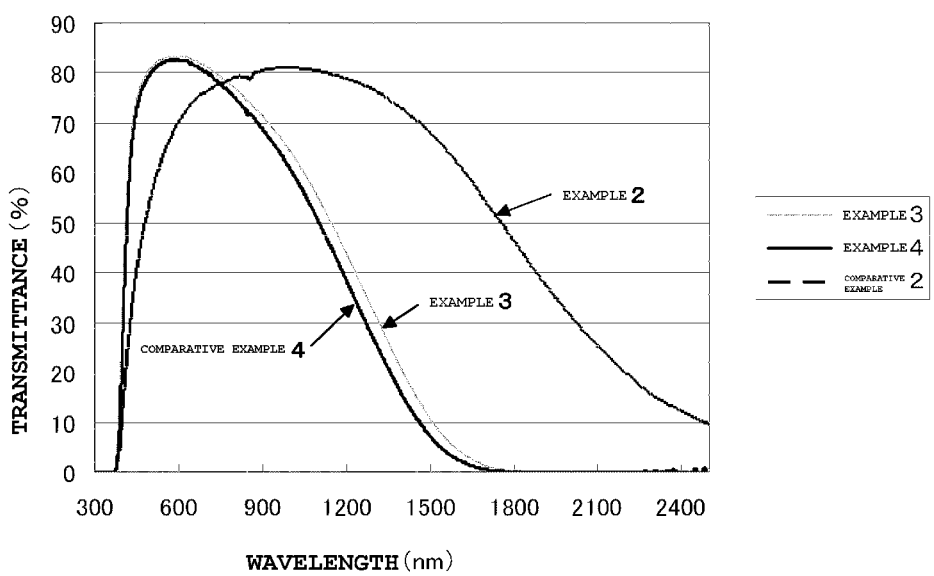
FIG. 2 is a graph showing the spectroscopic transmittance of heat ray shielding adhesive films in examples of the present invention and a comparative example.
Figure 3:
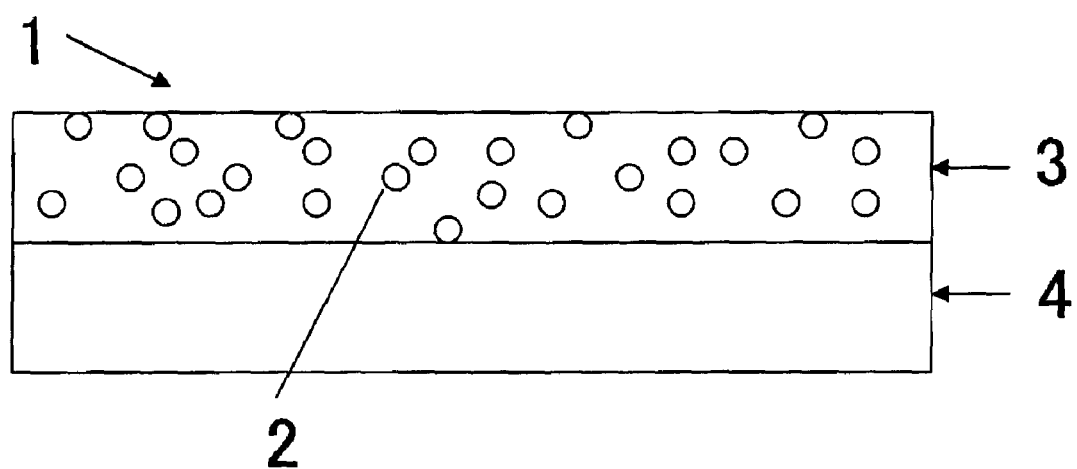
FIG. 3 is a drawing showing the heat ray shielding adhesive films and the heat ray shielding transparent adhesive sheet of the present invention.

Comparing Examples 1 and 2 with Comparative Example 1, absorbance in the infrared range at a wavelength of at least 1200 nm was greater while maintaining transmittance in the visible light range, as shown in FIG. 1. Solar heat gain was approximately 3 to 6% less and high heat shielding was achieved while maintaining high visible light transmittance, as shown in Table 2. Also demonstrated was that the haze values were lower, dispersion of heat-ray-shielding microparticles was better, and transparency was improved. Comparing Examples 3 and 4 with Comparative Example 2, absorbance in the infrared range at a wavelength of at least 1600 nm was greater and transmittance in the visible light range was improved as shown in FIG. 2. The visible light transmittance was improved by approximately 18%, solar heat gain was approximately 1 to 2.5% less, and higher transparency and heat shielding were achieved, as shown in Table 2. Also demonstrated was that the haze values were lower, dispersion of heat-ray-shielding microparticles was better, and transparency was improved.

The liquid dispersions of heat-ray-shielding microparticles used in Examples 1 and 2, Comparative Example 1, Examples 3 and 4, and Comparative Example 2 were Manufacturing Examples 2, 3, 4, 6, 7, and 8 respectively, and the half-value widths of these liquid dispersions were 0.441, 0.487, 0.904, 0.405, 0.511, and 0.878 respectively. This shows that using heat-ray-shielding microparticles having a half-value width between 0.01 and 0.80 inclusive yielded a lower solar heat gain, higher heat shielding, maintenance of higher visible light, transmittance, a lower haze value, better dispersion of heat-ray-shielding microparticles, and improved transparency.

KEY TO SYMBOLS

1 Heat ray shielding transparent adhesive sheet
2 Heat-ray-shielding microparticles
3 Adhesive layer
4 Glass

The invention claimed is:

1. A heat-ray-shielding-adhesive composition comprising heat-ray-shielding microparticles in which the half-value width of a first main peak obtained by an X-ray diffraction pattern is 0.01 to 0.80°, wherein the heat-ray-shielding microparticles are selected from the group consisting of tin oxide, indium oxide, zinc oxide, tungsten oxide, chromium oxide and molybdenum oxide, and wherein the essential components of said composition are (A) the heat-ray-shielding microparticles, (B) an acrylic copolymer and (C) a dispersant, and the acrylic copolymer contains structural units of a monomer containing an acid anhydride or a carboxyl group in an amount of 1 to 5% by weight of all monomer structural units in the polymer.

2. The heat-ray-shielding-adhesive composition according to claim 1, wherein said heat-ray-shielding microparticles comprise primary particles, and wherein the diameter of the primary particles of the heat-ray-shielding microparticles is 1 to 100 nm and the specific surface area of the primary particles as calculated by BET is 5 to 200 m$^2$/g.

3. The heat-ray-shielding-adhesive composition according to claim 1 or 2, characterized in that the heat-ray-shielding microparticles are selected from the group consisting of tin oxide, indium oxide, and zinc oxide.

4. The heat-ray-shielding-adhesive composition according to claim 1, characterized in that the weight-average molecular weight of the acrylic copolymer is 100,000 to 1,200,000.

5. A varnish composition obtained by dispersing the heat-ray-shielding-adhesive composition according to claim 1 in a solvent at a minimum.

6. A heat ray shielding transparent adhesive sheet obtained by applying the heat-ray-shielding-adhesive composition according to claim 1 or the varnish composition according to claim 5.

7. The heat ray shielding transparent adhesive sheet according to claim 6, characterized in having a visible light transmittance of 50% or greater, a solar transmittance of 80% or less, and a haze of 8% or less.

8. A method for manufacturing a heat-ray-shielding-adhesive composition according to claim 1, comprising a step of mixing a heat ray shielding microparticle liquid dispersion containing heat-ray-shielding microparticles and a dispersant, and an adhesive containing an acrylic copolymer.

* * * * *